Patented Dec. 3, 1935

2,022,894

UNITED STATES PATENT OFFICE 2,022,894

HIGH MOLECULAR ALCOHOLS AND UNSATURATED HYDROCARBONS

Walter H. McAllister, Wyoming, Ohio, assignor to The Procter & Gamble Company, Cincinnati, Ohio, a corporation of Ohio No Drawing. Application December 2, 1932, Serial No. 645,478

13 Claims. (Cl. 204—9)

My invention relates to a process for obtaining from soaps, or salts of higher fatty acids, either saturated or unsaturated, products consisting mainly of a mixture of higher alcohols, (saturated or unsaturated), and unsaturated hydrocarbons of the olefine series, by means of electrolysis. It relates further to the products obtained from this process.

My primary object is to provide a means for obtaining these materials, that is, higher alcohols and olefines, as the main products of the reaction, in form suitable for sulfonation or other use, at low cost, from materials readily obtainable,—the sulfonated products or their salts having valuable wetting, emulsifying, and detergent properties. The term "sulfonated" as used herein should be understood to cover any and all products resulting from the action of sulfuric acid, chlorsulfonic acid or similar products on alcohols or olefines.

Previous investigators have shown that alcohols can be obtained in good yields by electrolysis of salts of the lower saturated acids of the fatty series, especially the acetate in solutions containing certain inorganic salts such as bicarbonates and perchlorates; but with acids containing six or more carbon atoms in the molecule, the main product was always a saturated hydrocarbon with little or no alcohol or olefine. See, for example, Hofer and Moest, Ann. 323, 284 (1902), and J. Petersen, Z. physik. Chem. 33, 319 (1900), also Z. Elektrochemie 12, 141 (1906).

The main reaction with potassium laurate, for example, took place as follows:

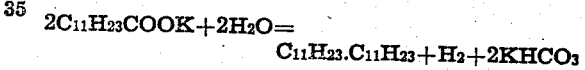

Hydrocarbons of this type have no value for sulfonation.

Unsaturated hydrocarbons or olefines have likewise been obtained by the electrolysis of salts of saturated acids of low molecular weight only, and again as in the above mentioned production of alcohols, salts of saturated fatty acids having more than about six carbon atoms, have yielded little or no unsaturated hydrocarbons. Salts of unsaturated fatty acids, however, even those having six or more carbon atoms, have yielded certain unsaturated hydrocarbons, but mainly of the type of diolefines formed by union of residues from 2 molecules of acid (analogous to the formation of saturated hydrocarbons as previously mentioned in electrolysis of salts of saturated acids), instead of diolefines of one less carbon atom per molecule than the original salt, as are yielded by the present invention. Potassium oleate, ($C_{17}H_{33}COOK$), for example, has in past practice yielded chiefly $C_{17}H_{33}.C_{17}H_{33}$ with a small amount of $C_{17}H_{32}$.

My improvement consists in the discovery of means for obtaining products by electrolysis of salts of the higher molecular fatty acids containing six or more carbon atoms, which products consist mainly of alcohols and/or olefines, both of which products may readily be converted to useful sulfuric esters or sulfonic compounds. It will be understood that for the purposes of sulfonation of the product of the present invention, it is of little importance whether the alcohols or the corresponding olefines predominate, as the alcohol and olefine of equal number of carbon atoms both produce valuable sulfonic compounds under proper sulfonating conditions. Saturated acids produce mainly saturated alcohols of one less carbon atom and olefines of one less carbon atom than the original acid, whereas unsaturated acids produce mainly unsaturated alcohols of one less carbon atom and diolefines in which each molecule likewise has one less carbon atom than the original acid. Salts of individual fatty acids, or salts of mixed fatty acids such as occur in commercial oils or fats, may be used as raw materials.

The principal factors which I have found necessary in obtaining alcohols and olefines as the principal products are the use of certain inorganic salts and of ethyl or other soluble alcohol in the solution in proper proportions, and especially the use of anodes of suitable material, of which graphite, and a mixture of graphite with amorphous carbon, are among the best, all of which factors are more fully described hereafter.

The addition of certain salts to the solution, particularly certain alkali salts of inorganic acids, has previously been reported as very beneficial. They increase the content of the desired alcohols and olefines in the products, as well as increase the electric energy efficiency. Alkali chlorates, perchlorates, and bicarbonates are among the most efficient salts for this purpose, although many other salts give good results under some conditions. Best results are obtained by adding the salts at the beginning of the operation, although some alkali bicarbonate is formed during the course of the electrolyzing operation and eventually will accumulate to an amount sufficient to be of considerable assistance in directing the reaction in the desired way. Strongly alkaline compounds, such as alkali carbonates and hydroxides are harmful, leading to the formation of undesired products, including the evolution of oxygen at the anode.

The addition of rather large percentages of a low molecular water soluble aliphatic monohydric alcohol such as ethyl alcohol is also of considerable value in the electrolysis, particularly because it is found that its presence increases solubility of the soap, and increases the conductivity of the solution, thus leading to a higher current density with a given voltage, and to a higher electric energy efficiency. It has been previously used to reduce foaming of salt solutions of organic acids during electrolysis.

The nature of the anode material is one of the most important factors affecting the course of the reaction. While smooth platinum is the material used by previous investigators, I find that the best yields of higher alcohols and olefines can be obtained only by the use of anodes made essentially of graphite or mixtures of graphite and amorphous carbon, although certain other materials, such as palladium and platinized platinum, have been found useful in certain cases. The nature of the cathode material is of little importance in affecting the course of the reaction.

A considerable portion of the high molecular alcohols formed by the electrolysis usually combines with fatty acids to form esters, and likewise some of the ethyl or other alcohol used in the process also combines with some fatty acids to form esters; but all such esters are readily broken up by saponification, thus setting free the alcohols.

In the preferred way of carrying out this improved process, I first prepare a solution of the soap in water and ethyl or other suitable alcohol. This may be done by dissolving soap, which has previously been prepared separately, or it may be accomplished by dissolving fatty acids in the alcohol, neutralizing the same, as with the proper quantity of caustic potash or soda, and then diluting to the required extent. The proportions of the various ingredients, that I find desirable and effective are approximately as follows, although it should be understood that quantities outside of these figures may also be used:

| | Per cent. |
|---|---|
| Soap (anhydrous) | 10–15 |
| Salts (chlorate, etc.) | 3– 6 |
| Alcohol (low molecular) | 10–30 |
| Water | 55–66 |

The percentage of soap to be used in the solution will depend somewhat on its solubility, although it is desirable to have as high a concentration as is possible. Percentages, however, are unavoidably limited by low solubility of the soap in some cases, such as soaps of stearic acid for example.

The most efficient salts are the perchlorates and chlorates of potassium or sodium, but various other inorganic salts of these metals, such as the sulphates and bicarbonates, are also fairly effective.

The solution thus formed is then subjected to electrolysis in a cell, which may be of any of the usual forms, but is preferably equipped with an agitator and also with a condenser to return volatile materials to the solution. The anodes are preferably of graphite or a mixture of graphite and amorphous carbon, while the cathodes may be of copper or any other convenient material.

The applied voltage and current density may vary within wide limits, but I find that usually about 5 volts give good results, with a current density of about 3 to 8 amperes per square decimeter of anode surface.

The temperature during electrolysis may likewise vary within wide limits, but I find that temperatures in the vicinity of 50° C. usually give good results.

I have obtained products containing over 50% of the desired alcohols and olefines with variations of voltage from 2.5 to 30, amperes from 0.1 to 11.5, current density from 0.35 to 50 amperes per square decimeter, and temperature from 25° to 70° C. Rather high concentrations of soap and of inorganic electrolyte are advantageous.

During the progress of the electrolysis, the soap decomposes, the fatty matter going largely to alcohols and olefines, and the alkali metal going largely to bicarbonate, as the following equations will explain:—

$C_{11}H_{23}COOK + 2H_2O = C_{11}H_{23}OH + KHCO_3 + H_2$

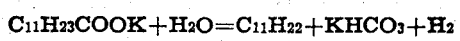
$C_{11}H_{23}COOK + H_2O = C_{11}H_{22} + KHCO_3 + H_2$

It is necessary, in long continued operation, to add free fatty acids from time to time to neutralize the alkali hydroxides or bicarbonates, thus forming more soap as required for continuance of the operation. Or, instead of fatty acids, soap may be added to replace that decomposed, as long as the concentration of alkaline salts is not allowed to increase to a point where the reaction is interfered with.

The products of electrolysis usually float on top of the soap solution, and may be separated from the solution by extraction with a suitable solvent, or if the operation is to be continued over a long period, the products may be removed from the surface of the solution from time to time without interrupting the electrolysis. A portion of the alcohols is usually found to be combined with fatty acids in the form of esters; hence, if a recovery of all the alcohol is required, the products of electrolysis are next subjected to saponification to set free the alcohols from the esters. The product thus obtained after saponification will, therefore, contain all the alcohols formed in the electrolysis, all of the olefines formed, and any other material which may be formed as by-product. The latter is found to consist almost entirely of saturated hydrocarbons, which are always present to a minor extent in the products of this process; small quantities of aldehydes are also usually found.

The following specific examples are illustrative of the method of carrying out this invention: (In calculating the percentages of alcohols and unsaturated hydrocarbons in the product, it is assumed that the balance of the product consists only of saturated hydrocarbons.)

*Example 1.*—A solution containing 15% of potassium soap of hydrogenated cocoanut oil, 14% denatured alcohol, (formula #30), and 71% water, was electrolyzed between graphite electrodes with an applied potential of 25 volts, a current of 2.4 amperes and an anode current density of 3.1 amperes per square decimeter. The solution contained only a negligible amount of inorganic salts at the beginning of the electrolysis. After completion of the electrolysis, the products were extracted from the soap solution, heated with alcoholic potassium hydroxide to decompose esters, and the unsaponifiable material extracted with petroleum ether. The original fatty acids in the soap had an iodine value of 0.6 and a saponification value of 263; the product had an iodine value of 28.0 and a hydroxyl value of 118. From this data the products were calculated to contain 39% higher alcohols and about 18% olefines, or about 57% combined higher alcohol and olefines. This shows the relatively low percentage purity of the product in the absence of added salts. It also shows the relatively high voltage required in the absence of added salts.

*Example 2.*—A solution containing 10% potassium hydrogenated cocoanut oil soap, 3% potassium sulfate, 23% formula #30 alcohol, and 64% of water was electrolyzed with graphite electrodes with an applied potential of 7.5 volts, a current of 2.4 amperes and an anode current density of 3.2 amperes per square decimeter. The product, which was separated and purified as in Example 1, possessed an iodine value of 40 and an hydroxyl value of 157. Since the original fatty acids in the soap had an iodine value of 0.6 and a saponification value of 263, the product was calculated to contain 52% higher alcohols and about 25% olefines, or 77% total.

*Example 3.*—A solution containing 13% potassium cocoanut oil soap, (not hydrogenated oil), 6% potassium perchlorate, 15% formula #30 alcohol, and 66% of water was electrolyzed with a graphite anode and a copper cathode with a current of 2.3 amperes and an anode current density of 3.0 amperes per square decimeter. The fatty acids of the original soap had an iodine value of 8.6 and a saponification value of 271. The product, separated and purified as in Example 1, had an iodine value of 41 and an hydroxyl value of 181. Therefore, the product was calculated to contain 58% higher alcohols and about 19% olefines and di-olefines (of one less carbon atom than the original fatty acids), or 77% total.

*Example 4.*—A solution containing 13% potassium cocoanut oil soap, 5% potassium chlorate, 18% formula #30 alcohol, and 64% of water was electrolyzed with a graphite anode and a copper cathode with a current of 1.2 amperes and an anode current density of 1.64 amperes per square decimeter. Starting with fatty acids in the soap having an iodine value of 8.6 and a saponification value of 271, a product was obtained with an iodine value of 71 and an hydroxyl value of 138. The product thus was calculated to contain 44% higher alcohols and about 40% olefines and di-olefines (of one less carbon atom than the original fatty acids), or 84% total.

*Example 5.*—A solution containing 12% potassium hydrogenated cocoanut oil soap, 6% sodium chlorate, 2.5% potassium bicarbonate, and 79.5% of water, but no added alcohol, was electrolyzed with graphite electrodes at a potential of 3.0 volts, a current of 1.1 amperes and a current density of 0.37 ampere per square decimeter. The product, purified as in Example 1, possessed an iodine value of 35 and an hydroxyl value of 166. Since the original fatty acids in the soap had an iodine value of 0.6 and a saponification value of 263, the product was calculated to contain 53% higher alcohols and 23% olefines, or 76% total. This shows that even in the absence of added alcohol good purity can be obtained; but the energy efficiency was found to be very low, as shown in Example 9.

*Example 6.*—To show the difference in results with graphite and with smooth platinum electrodes, two cells, each containing 14% sodium cocoanut oil soap, 5% potassium chlorate, 20% formula #30 alcohol, and 61% water, were connected in parallel and electrolyzed at 50° C. using a potential of 5 volts with each cell. A graphite anode was used in one cell and smooth platinum anode of the same area was used in the other. Graphite cathodes of equal area were used in the two cells. After separation and purification of the products as in Experiment 1, that from the cell with the graphite anode was found to be liquid at room temperature and had an iodine value of 73 and an hydroxyl value of 95, while that from the cell with smooth platinum anode was found to be solid at room temperature and had an iodine value of 35 and an hydroxyl value of 77. Since the original fatty acids in the soap had an iodine value of 9.9 and a saponification value of 269, the products from graphite and platinum anodes respectively were calculated to contain 30% and 25% higher alcohols, and 39% and 14% unsaturated hydrocarbons of one less carbon atom than the original fatty acids, or about 69% total with graphite anode, and only 39% total with platinum anode. The cells in this example were practically identical with the exception that anodes of different materials were used. However, with the graphite anode, the current amounted to 2.44 amperes and the current density to 14.7 amperes per square decimeter; while with the platinum, the current was much less, being 1.46 amperes and the current density 8.85 amperes per square decimeter. The differences in composition of the products, however, were not due to current density alone, for electrolysis of an identical solution in the same cell with a smooth platinum anode under the same conditions as above, except that a potential of 7.0 volts was used and a current of 3.05 amperes and a current density of 18.4 amperes per square decimeter was obtained, gave a product with an iodine value of 26 and an hydroxyl value of 87, corresponding to only 28% high molecular alcohols and 8.7% unsaturated hydrocarbons of one less carbon atom than the original acids, or about 37% total, which is approximately the same as obtained with the lower current density and with the smooth platinum anode. Under similar conditions, graphite anodes always give much higher purity of the desired products than smooth platinum anodes.

*Example 7.*—Commercial "red oil", consisting mainly of oleic acid, was used in this experiment. It had an iodine value of 94 and saponification value of 195. A solution containing 10% of the sodium soap of red oil, 5% sodium chlorate, 29% formula #30 alcohol, and 56% water was electrolyzed at 50° C. with graphite electrodes, and with an applied potential of 5.0 volts, a current of 2.3 amperes, and an anode current density of 3.1 amperes per square decimeter. The product, separated and purified as in Example 1, had an iodine value of 153 and an hydroxyl value of 63. Therefore the product was calculated to contain 29% unsaturated higher alcohols and 42% unsaturated hydrocarbons containing one less carbon atom per molecule than the original fatty acids, or a total of 71%.

*Example 8.*—The soap used in this experiment was prepared by saponification of commercial stearic acid, which is a substantially completely saturated acid of high molecular weight, with an iodine value of 2.5 and a saponification value of 210. A solution containing 2.6% of the potassium soap, 5% sodium chlorate, 31% formula #30 alcohol and 61.4% water was electrolyzed at 50° C. with graphite electrodes, using a potential of 5.2 volts, a current of 1.53 amperes and an anode current density of 2.0 amperes per square decimeter. The product, recovered and purified as in Example 1, was liquid at room temperature and had an iodine value of 58 and an hydroxyl value of 75, corresponding to about 32% higher alcohols and 48% olefines of one less carbon atom per molecule than the original fatty acids contained, or a total of 80%.

Example 9.—A solution containing 14% potassium hydrogenated cocoanut oil soap, 5% potassium chlorate, 20% of formula #30 alcohol and 61% water was electrolyzed at 50° C. with graphite electrodes at 5.0 volts. The average current over a period of 8 hours was 3.15 amperes. Using the same cell, electrodes, voltage, and other conditions, with a solution of 14% potassium hydrogenated cocoanut oil soap, 5% potassium chlorate, and 81% water, but no low molecular alcohol, an average current of only 0.65 ampere was obtained during the first 8 hours of the electrolysis. This shows the improved conductivity when ethyl alcohol is present. Furthermore the yield of products per faraday of electricity used was 53 grams when ethyl alcohol was present and only 2 grams when no alcohol was added.

Both higher alcohols and olefines as produced in this process are valuable in themselves or as raw materials for preparation of valuable products. For example, either of these products or a mixture of the two types of products may be converted to alkali alkyl sulfates or sulfonates which have typical soap-like properties, by means of well-known procedures. It is not necessary to separate one from the other when they are to be used for this purpose.

Previously, there has been no practical method for preparation of the higher alcohols and corresponding olefines of an odd number of carbon atoms in the molecule. The olefines prepared by this method from saturated acids are believed to have the double bond at the end of the aliphatic chain, and therefore are especially valuable for the preparation of useful sulfonated products.

As a method for preparation of the higher alcohols and olefines, the electrolysis of soap solutions possesses distinct advantages over any other method yet proposed for preparation of such products. The process is economical, and is less dangerous than preparation of alcohols by high pressure hydrogenation of oils or of fatty acids.

Many widely differing modifications of this invention may be made without exceeding the spirit or scope thereof, but it is to be understood that I do not limit myself to the specific examples or description given above except as defined in the appended claims.

Having thus described my invention, what I claim as new and desire to secure by Letters Patent is:—

1. The process of making alcohols and/or unsaturated hydrocarbons having one less carbon atom per molecule than the salt used as raw material, which comprises subjecting to electrolysis with anodes made essentially of carbon, of which a substantial portion is in the graphite form, a solution containing a soluble salt of an aliphatic acid having at least six carbon atoms per molecule, about ten percent to about thirty percent of a water soluble aliphatic monohydric alcohol, and about three percent to about eight and one-half percent of inorganic alkali salts in the group composed of chlorates, perchlorates, bicarbonates and sulfates.

2. The process of making alcohols and/or unsaturated hydrocarbons having one less carbon atom per molecule than the salt used as raw material, which comprises subjecting to electrolysis with anodes made essentially of carbon, of which a substantial portion is in the graphite form, a solution containing a soluble salt of an aliphatic acid having at least six carbon atoms per molecule, a water soluble aliphatic monohydric alcohol, and inorganic alkali salts in the group composed of chlorates, perchlorates, bicarbonates and sulfates.

3. The process of making products consisting of more than fifty percent of alcohols and/or unsaturated hydrocarbons having one less carbon atom per molecule than the salt used as raw material, which comprises subjecting to electrolysis with anodes made essentially of carbon, of which a substantial portion is in the graphite form, a solution containing a soluble salt of an aliphatic acid having at least six carbon atoms per molecule, about ten percent to about thirty percent of a water soluble aliphatic monohydric alcohol, and about three percent to about eight and one-half percent of inorganic alkali salts in the group composed of chlorates, perchlorates, bicarbonates and sulfates.

4. The process of making products consisting of more than fifty percent of alcohols and/or unsaturated hydrocarbons having one less carbon atom per molecule than the salt used as raw material, which comprises subjecting to electrolysis with anodes made essentially of carbon, of which a substantial portion is in the graphite form, a solution containing a soluble salt of an aliphatic acid having at least six carbon atoms per molecule, a water soluble aliphatic monohydric alcohol, and inorganic alkali salts in the group composed of chlorates, perchlorates, bicarbonates and sulfates.

5. The process of making alcohols and/or unsaturated hydrocarbons having one less carbon atom per molecule than the salt used as raw material, which comprises subjecting to electrolysis with anodes made essentially of carbon, of which a substantial portion is in the graphite form, a solution containing a soluble salt of an aliphatic acid having at least six carbon atoms per molecule, about ten percent to about thirty percent of a water soluble aliphatic monohydric alcohol, and about three percent to about eight and one-half percent of inorganic alkali salts in the group composed of chlorates, perchlorates, bicarbonates, and sulfates, and subjecting the product of electrolysis to saponification.

6. The process of making alcohols and/or unsaturated hydrocarbons having one less carbon atom per molecule than the salt used as raw material, which comprises subjecting to electrolysis with anodes made essentially of carbon, of which a substantial portion is in the graphite form, a solution containing a soluble salt of an aliphatic acid having at least six carbon atoms per molecule, a water soluble aliphatic monohydric alcohol, and inorganic alkali salts in the group composed of chlorates, perchlorates, bicarbonates, and sulfates, and subjecting the product of electrolysis to saponification.

7. The process of making products consisting of more than fifty percent of alcohols and/or unsaturated hydrocarbons having one less carbon atom per molecule than the salt used as raw material, which comprises subjecting to electrolysis with anodes made essentially of carbon, of which a substantial portion is in the graphite form, a solution containing a soluble salt of an aliphatic acid having at least six carbon atoms per molecule, about ten percent to about thirty percent of a water soluble aliphatic monohydric alcohol, and about three percent to about eight and one-half percent of inorganic alkali salts in the group composed of chlorates, perchlorates, bicarbonates, and sulfates, and subjecting the product of electrolysis to saponification.

8. The process of making products consisting of more than fifty percent of alcohols and/or unsaturated hydrocarbons having one less carbon atom per molecule than the salt used as raw material, which comprises subjecting to electrolysis with anodes made essentially of carbon, of which a substantial portion is in the graphite form, a solution containing a soluble salt of an aliphatic acid having at least six carbon atoms per molecule, a water soluble aliphatic monohydric alcohol, and inorganic alkali salts in the group composed of chlorates, perchlorates, bicarbonates, and sulfates, and subjecting the product of electrolysis to saponification.

9. The process of making alcohols and/or unsaturated hydrocarbons having one less carbon atom per molecule than the salt used as raw material, which comprises subjecting to electrolysis with carbon anodes containing a substantial amount of graphite a solution containing a soluble salt of the fatty acids derived from coconut oil, about ten per cent to about thirty per cent of ethyl alcohol and about three per cent to eight and one half per cent of inorganic alkali salts in the group composed of chlorates, perchlorates, bicarbonates and sulfates.

10. The process of making products consisting of more than fifty per cent of alcohols and/or unsaturated hydrocarbons having one less carbon atom per molecule than the salt used as raw material, which comprises subjecting to electrolysis with carbon anodes containing a substantial amount of graphite a solution containing a soluble salt of the fatty acids derived from coconut oil, ethyl alcohol and inorganic alkali salts in the group composed of chlorates, perchlorates, bicarbonates and sulfates, and subjecting the product of electrolysis to saponification.

11. Alcohols and/or unsaturated hydrocarbons from which products possessing washing, foaming and emulsifying properties are obtained by sulfation having one less carbon atom per molecule than the salt used as raw material, prepared by the process comprising subjecting to electrolysis, with anodes made essentially of carbon of which a substantial portion is in the graphite form, a solution containing a soluble salt of an aliphatic acid having at least six carbon atoms per molecule, a water-soluble aliphatic monohydric alcohol and inorganic alkali salts in the group composed of chlorates, perchlorates, bicarbonates, and sulfates.

12. A product, consisting of more than fifty per cent of alcohols and/or unsaturated hydrocarbons having one less carbon atom per molecule than the salt used as raw material, prepared by the process comprising subjecting to electrolysis, with anodes made essentially of carbon of which a substantial portion is in the graphite form, a solution containing a soluble salt of an aliphatic acid having at least six carbon atoms per molecule, about ten per cent to about thiry per cent of a water soluble aliphatic monohydric alcohol and about three per cent to 8.5 per cent of inorganic alkali salts in the group composed of chlorates, perchlorates, bicarbonates, and sulfates.

13. Alcohols and/or unsaturated hydrocarbons having one less carbon atom per molecule than the salt used as raw material, prepared by the process which comprises subjecting to electrolysis, with anodes made essentially of carbon of which a substantial portion is in the graphite form, a solution containing a soluble salt of an aliphatic acid having at least six carbon atoms per molecule, a water-soluble aliphatic monohydric alcohol, and inorganic alkali salts in the group composed of chlorates, perchlorates, bicarbonates, and sulfates, and subjecting the product of electrolysis to saponification.

WALTER H. McALLISTER.